Jan. 14, 1936.  A. J. GILLIES  2,027,970
CENTRIFUGAL CLUTCH
Filed April 4, 1935
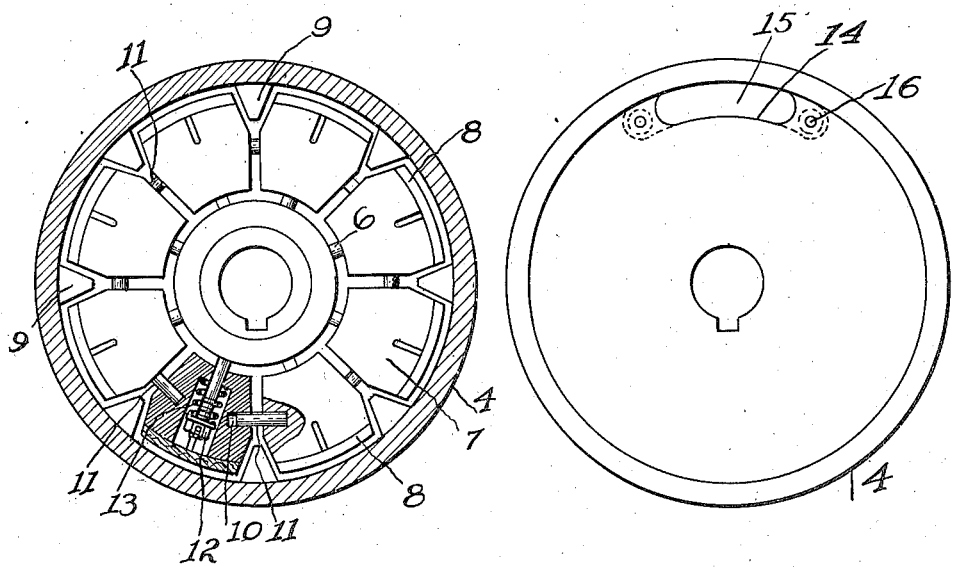
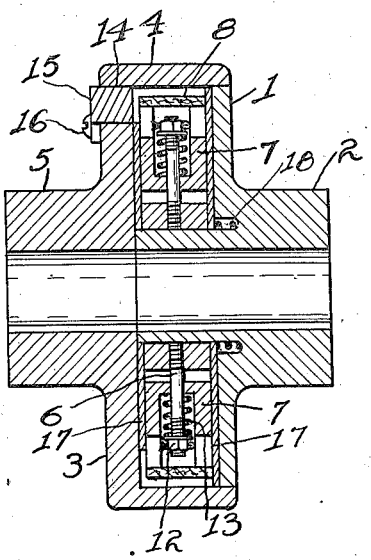
INVENTOR
A. J. Gillis
BY J. Edw. Maybee
ATTY Patented Jan. 14, 1936

2,027,970

UNITED STATES PATENT OFFICE 2,027,970

CENTRIFUGAL CLUTCH

Alfred James Gillies, Toronto, Ontario, Canada

Application April 4, 1935, Serial No. 14,579
In Great Britain April 23, 1934

4 Claims. (Cl. 192—105)

This invention relates to centrifugal clutches particularly adapted for the purpose of gradually applying and limiting the load to a prime mover, such, for example, as a Diesel engine, and my object is to provide a clutch of this type which, while effective in operation, is simple in construction, easily assembled, and cheap both in capital cost and maintenance.

I attain my object by improvements on a construction which may be briefly described as follows: A disc forms the driving member of the clutch and on it are arranged a plurality of centrifugal shoes which are radially guided on the disc to engage the inner periphery of a drum-like driven member. Means are provided interconnecting the shoes to synchronize their radial movements and hold them in the plane of rotation.

According to the invention, adjacent shoes have holes formed in adjacent sides having their axes at right-angles to a plane bisecting the angle between the radial planes of the direction of movement of the adjacent shoes, pins being provided to engage in said holes and to slide in one or both of them.

According to the invention, moreover, separate loose brake lining segments are positioned between the shoes and the drum and the driven member is provided with a window, having a removable closure, through which the segments may be removed and replaced.

The invention further comprises the features which are hereinafter described and claimed.

The invention is described and is illustrated in the accompanying drawing in which—

Fig. 1 is an outside face view of the driving member, the flange of the driven member being shown in section;

Fig. 2 a similar view of the driven member; and

Fig. 3 a longitudinal section.

In the drawing like numerals of reference indicate corresponding parts in the different figures.

The driving member 1 is formed as a disk and is provided with the hub 2. The driven member 3 is formed with the annular flange 4 which sleeves over the disk of the driving member 1. The driven member is formed with a hub 5 with which a shaft, pulley or a gear pinion may be connected. The shaft of a prime mover may be connected to the hub 2. A loose sleeve on the hub 2 has cast therein or otherwise secured thereto the cylindrical radial pins 6 on which are guided the centrifugal clutch shoes 7 which are adapted, through the medium of loose segments of brake lining 8, to engage the inner surface of the flange or drum 4 of the driven member 3. Between the outer ends of the shoes are positioned the lugs 9 which extend from the disk 1 and of which the sides are parallel to the direction of movement of the adjacent shoes. These lugs prevent circumferential displacement of the segments of brake lining and relieve the radial pins of the driving strain of the shoes.

These lugs and the radial pins accurately guide the shoes radially without danger of binding.

It is important that the shoes should be so connected that they move simultaneously into and out of operative position. To effect this result I form in the sides of the shoes 7 the holes 10, the axes of adjacent holes being at right angles to a plane bisecting the angle between the radial planes of the direction of movement of the adjacent shoes. Pins 11 are inserted in adjacent holes 10. Thus it follows that each shoe must follow the movements of its neighbors and that, as the shoes move in and out, the pins must necessarily slide in the holes. Each pin may be slidable in both of the holes into which it extends or may be fixed in one of them. These pins serve also to limit the outward movement of the shoes by engagement with the lugs 9, thus preventing all possibility of the metal of the shoes coming into contact with the drum if the brake linings wear through.

Means are provided for retracting the shoes when the driving member is revolving below a predetermined speed. For this purpose each shoe is counterbored and each radial pin is provided with an abutment such as a nut 12 threaded on the pin. Between the nut and the shoulder of the counterbore is positioned a coil spring 13. These springs in the aggregate exert enough pressure to retract the shoes when the clutch is moving below the predetermined speed. The compression of the springs can readily be adjusted by means of the nuts 12 to thus vary the speed at which the clutch will engage and disengage.

To enable the brake lining segments to be replaced I form a window 14 in the driven member which is normally closed by the cap 15 held in place by the screws 16.

By turning the driving and driven members relative to one another to successively aline the window with successive lining segments, each in its turn may be withdrawn and a fresh segment inserted, thus avoiding the necessity of disassembling the clutch. Preferably the driving and driven member are provided with linings 17 of fibre or any anti-chatter material to prevent chatter and noise, one of which may be backed by a spring such as 18 to take up wear. This construction gives the coupling a certain degree of flexibility so that it will function even if slightly out of alinement.

I may also provide manually operable means for actuating the clutch shoes if desired.

From the above description it will be seen that I have devised a construction which is simple and requires a minimum of machine work in its manufacture as it mainly comprises die castings. It is also efficient in operation and enables a prime mover to be started without load and to gradually pick up its load as speed increases. The means for synchronously guiding the shoes operate with a minimum of friction which makes the clutch sensitive in operation and accurately adjustable.

What I claim as my invention is:

1. A centrifugal clutch comprising a driving member, centrifugal shoes arranged in series side by side and guided on the driving member for radial movement and a driven member having a drum engageable by the shoes characterized in that adjacent shoes have cylindrical holes formed in adjacent sides having their axes at right angles to a plane bisecting the angle between the radial planes of the direction of movement of the adjacent shoes and cylindrical pins are provided engaging in said holes and slidable in one or both of them.

2. A centrifugal clutch according to claim 1 in which the guidance of the shoes for radial movement is provided by radial pins on a hub concentric with the driving member.

3. A centrifugal clutch according to claim 1 in which lugs are provided adjacent the periphery of the driving member serving as guides for the outer ends of the shoes, and in which loose pieces of brake lining are positioned between the shoes and the drum and are held from endwise movement by the aforesaid lugs.

4. A centrifugal clutch according to claim 1 in which lugs are provided adjacent the periphery of the driving member serving as guides for the outer ends of the shoes, and in which pieces of brake lining are positioned between the shoes and the drum and are held from endwise movement by the aforesaid lugs, the pins and lugs being positioned and proportioned to engage to limit the outward movement of the shoes and thus prevent the metal of the shoes coming into contact with the drum if the brake linings wear through.

ALFRED JAMES GILLIES.